US008078580B2

(12) United States Patent
Anand et al.

(10) Patent No.: US 8,078,580 B2
(45) Date of Patent: Dec. 13, 2011

(54) HYBRID DATA ARCHIVAL METHOD AND SYSTEM THEREOF

(75) Inventors: Pankaj Anand, Haryana (IN); Nitin Arora, Haryana (IN); Puneet Trehan, Haryana (IN); Rakesh Sharrma, Haryana (IN); Aniruddha Chaudhuri, Cupertino, CA (US); Pankaj Sharma, Haryana (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 389 days.

(21) Appl. No.: 12/294,939

(22) PCT Filed: May 31, 2007

(86) PCT No.: PCT/IB2007/001429
§ 371 (c)(1),
(2), (4) Date: Sep. 29, 2008

(87) PCT Pub. No.: WO2007/138465
PCT Pub. Date: Dec. 6, 2007

(65) Prior Publication Data
US 2010/0179943 A1 Jul. 15, 2010

(30) Foreign Application Priority Data
May 31, 2006 (IN) .......................... 1315/DEL/2006

(51) Int. Cl.
*G06F 17/30* (2006.01)
(52) U.S. Cl. .......................... 707/640; 707/675; 711/112
(58) Field of Classification Search .................. 707/640, 707/674, 675, 661; 711/112
See application file for complete search history.

(56) References Cited

U.S. PATENT DOCUMENTS

| 6,633,887 | B2 * | 10/2003 | Suzuki et al. ................. 707/705 |
| 7,225,208 | B2 * | 5/2007 | Midgley et al. ............... 707/609 |
| 7,299,277 | B1 * | 11/2007 | Moran et al. .................. 709/224 |
| 7,539,867 | B2 * | 5/2009 | Bolosky et al. ............... 713/175 |
| 7,640,262 | B1 * | 12/2009 | Beaverson et al. ........... 707/705 |
| 2002/0087588 | A1 | 7/2002 | McBride et al. |
| 2003/0041221 | A1 * | 2/2003 | Okada .......................... 711/164 |
| 2005/0060356 | A1 | 3/2005 | Saika |
| 2005/0076173 | A1 * | 4/2005 | Merril et al. ................. 711/100 |
| 2007/0033374 | A1 * | 2/2007 | Sinclair et al. ............... 711/203 |
| 2008/0034011 | A1 * | 2/2008 | Cisler et al. .................. 707/640 |

OTHER PUBLICATIONS

"Retrospect—The best backup software for any storage device" Internet Citation, [Online] 1997, XP002255900 Retrieved from the Internet: URL:http: //www.datastor.co.nz/Datastor/PDF links.nsf/0/ 44cd9c861961cf654c2566ce0012f6d4/$FILE/retro.pdf> [retrieved on Sep. 26, 2003], the whole document.
"BrightStor ARCserve Backup for Small Business Server—Features, Descriptions, Benfits" Internet Citation, [Online] 2001, XP002252082 Retrieved from the Internet: URL:http: //www3.ca. com/Files/Brochures And Descriptions/bab_sbs_fdb.pdf> [retrieved on Aug. 22, 2003], the whole document.

* cited by examiner

*Primary Examiner* — Shahid Alam

(57) ABSTRACT

The present invention relates to a method and a system for obtaining both online and offline backups from one application with a single toggle operation. By performing the method of the present invention it would be possible to take hybrid backup of the data automatically according to a predetermined schedule. Also, the hybrid data backup method enables the easily retrieve the data.

8 Claims, No Drawings

HYBRID DATA ARCHIVAL METHOD AND SYSTEM THEREOF

FIELD OF THE INVENTION

The present invention relates to a method and a system for obtaining both online and offline backups from one application with a single toggle operation.

CROSS REFERENCE OF RELATED APPLICATIONS

The subject matter disclosed in the present application might be considered to be relevant to subject matter disclosed in co-pending Patent Application No. 2783/DEL/2005 filed 18 Oct. 2005, co-pending Patent Application No. 3030/DEL/2005 filed September 11 Nov. 2005, co-pending Patent Application No. 3049/DEL/2005 filed 15 Nov. 2005, co-pending Patent Application No. 1316/DEL/2006 filed 31 May 2006, co-pending Patent Application No. 1317/DEL/2006 filed 31 May 2006 and co-pending Patent Application No. 1318/DEL/2006 filed 31 May 2006, all of which are filed by the same inventors and the entire disclosure of each of which is hereby incorporated by reference herein for all purposes.

BACKGROUND AND PRIOR ART DESCRIPTION

There are two separate ways avoiding loss of data stored on a computer. The first way is by taking online backup of the data thus stored and the second way is by taking off-line backup of the data thus stored on the computer.

The process of taking online backup essentially comprises storing the data to be safeguarded on a remote location such as a backup server. On the other hand, the process of taking off-line backup essential comprises storing the data to be safeguarded on a memory device wherein the memory device or is connected directly to the computer terminal from which the data is being archived. The memory device for example can be CD, DVD, USB drive, external hard drive, or network drive. The process of taking offline process is also referred to as archiving in the specification.

To the best of the Applicants knowledge, the does not exist teaching which provides the option of taking both online and offline backups from one application with a single toggle operation.

SUMMARY OF THE INVENTION

Accordingly, the present invention provides a hybrid data backup method for storing user's data automatically according to a predetermined schedule, said method comprising the steps of obtaining details regarding at least one of the following (i) the watch location(s) and (ii) watch file type(s); periodically keeping a watch on the watch location(s) for (a) creation of new file(s) and/or (b) modifications of exiting file(s); preparing a file list wherein the list comprises details of the files that (a) have not been backed up and/or (b) created newly after a previous backup and/or (c) modified after a previous backup; obtaining details regarding the nature of backup to be performed in respect of each of the file contained in the file list; and storing the files on the list at a location which is determined on the basis of the nature of backup method to be performed at a predetermined scheduled time.

DETAILED DESCRIPTION OF THE INVENTION

Accordingly, the present invention provides a hybrid data backup method for storing user's data automatically according to a predetermined schedule, said method comprising the steps of:
(a) obtaining details regarding at least one of the following (i) the watch location(s) and (ii) watch file type(s);
(b) periodically keeping a watch on the watch location(s) for (a) creation of new file(s) and/or (b) modifications of exiting file(s);
(c) preparing a file list wherein the list comprises details of the files that (a) have not been backed up and/or (b) created newly after a previous backup and/or (c) modified after a previous backup;
(d) obtaining details regarding the nature of backup to be performed in respect of each of the file contained in the file list; and
(e) storing the files on the list at a location which is determined on the basis of the nature of backup method to be performed at a predetermined scheduled time.

In an embodiment of the present invention, the nature of backup to be performed are selected form the group comprising: an on-line backup method; an off-line backup method; and an on-line backup method and an off-line backup method.

In another embodiment of the present invention, the location corresponding to the on-line backup method is a backup server.

In yet another embodiment of the present invention, the location corresponding to the off-line backup method is an archival media selected from the group comprising a CD, a DVD, a USB drive, a external hard drive, or a network drive.

In still another embodiment of the present invention, the after storing the file, the location where the file is stored is stored in a list.

The following paragraphs are provided in order to describe the working of the invention and nothing in this section should be taken as a limitation of the claims.

DETAILED DESCRIPTION OF THE EMBODIMENTS

Before describing in detail embodiments that are in accordance with the present invention, it should be observed that the embodiments reside primarily in combinations of method steps of taking backup such that the backup procedure is faster, less bandwidth consuming and at the same time reliable.

Accordingly, the method steps have been represented where appropriate by conventional symbols in the drawings, showing only those specific details that are pertinent to understanding the embodiments of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, such that a process, method that comprises a list of steps does not include only those steps but may include other steps not expressly listed or inherent to such process, method. An element proceeded by "comprises . . . a" does not, without more constraints, preclude the existence of additional identical steps in the process or method that comprises the steps.

The method and the system of the present invention provide a method for archiving data so as to avoid accidental loss of the data. More particularly, the present invention provides an automatic method for taking back up of the data online to a secure server, or archive your files to CD, DVD, USB drive, external hard drive, or network drive.

Automatic online backup method of the present invention provides a secure, external storage location for personal data. To begin the method of the present invention, the following information must be recorded:

locations and types of files (watch folders and file types) that have to be archived, a schedule of the days and times on which the automatic backups occur.

This is called initial configuration.

When the initial configuration is complete, automatic backups occur in the background, providing the user with the security and protection without requiring costly maintenance. The user's backed up files are then ready to be synchronized across multiple computers, shared with e-mail recipients, and published to the Internet.

Local archiving allows the user to archive (back up) personal data to CD, DVD, USB drive, external hard drive, or network drive. This provides the user with a local copy of the records, documents, and other materials of personal interest in case of accidental loss.

The method of the present invention can be classified into two categories:

(a) Online Backup Process
(b) Local Backup Process

Both the above mentioned components of the present invention will be now described in detail in the following paragraphs.

Online Backup Process

The online backup method of the present invention can be used to back up a copy of the files on the computer to a remote, online server. Backing up the files in this way makes it easy for the user to retrieve information in case of accidental loss or damage. It also allows the user to access the files from multiple computers. For example, the user can use the method of the present invention to back up files from his computer located at the office and thereafter can access those online backed up filed from his home computer.

Before starting the process of backing up of the files, the user can customize some online backup options; for example, the folders and file types that needs to be backed up. The user can also set other backup options, such as data refresh rates, security settings, and proxy settings.

After setting up the online backup options, the user can configure how often the method of the present invention must obtain automatic online backups, or he can run manual backups at any time.

In addition to defining the folders that needs to be backed up, the user can also customize the method of the present invention to define therein watch locations and watch file types. Watch locations are the folders on a computer that the method of the present invention monitors for creation of new files or change in the state of the file. Watch file types are the types of files (for example, .doc, .xls, and so on) that the method of the present invention backs up within the watch locations. By default, the following file types are backed up; however, other file types can also be backed up.

Microsoft® Word documents (.doc)
Microsoft Excel® spreadsheets (.xls)
Microsoft PowerPoint® presentations (.ppt)
Adobe® PDF files (.pdf)
Plain text files (.txt)

The user can set up two types of watch locations: deep watch locations and shallow watch locations. If a particular watch location is classified as a deep watch location, the method of the present invention backs up the watch file types within that folder and its subfolders. If a particular watch location is classified as a shallow watch location, the method of the present invention backs up the watch file types within that folder only (not its subfolders). The user can also add files to a shallow watch location or identify locations that he wants to be excluded from the online backup. By default, the Windows Desktop and My Documents locations are set up as deep watch locations.

After setting up the watch file types and locations, the user can calculate how much space is required for the online backup based on the current contents of the watch locations.

The user can also specify how often the method of the present invention must refresh the list of missing files. Missing files are files that are currently stored in the online backup repository but have been deleted or moved out of a particular watch location. Each time the method of the present invention refreshes the list of missing files, it compares the contents of the online backup repository to the contents of the watch locations and file types, and lists any inconsistencies. By default, the Missing Files list is refreshed every 30 minutes.

Depending on the work preferences and the customization, the user can also set some security options, such as whether he want to activate the method automatically or whether to prompt for a password before modifying settings or deleting files in the method of the present invention. If the user has set up a proxy server to handle all incoming and outgoing Internet requests from a computer, he must provide the proxy details (server name, IP address, and authentication information) so that the method of the present invention can communicate with the computer.

Backup Process

By default, the method of the present invention is scheduled to run an automatic backup of the watch file types in the watch locations every fifteen minutes. This schedule ensures that a current backup of the files is maintained at all times. However, if the user does not want an automatic backup to run every fifteen minutes, he can adjust the schedule to suit his needs. For example, if the contents of the watch locations change only once an hour, the user can adjust the schedule so that an automatic backup is run every 60 minutes.

If the user wants to back up the contents of the watch locations on demand, he can do so at any time. For example, if the user modifies a file and wants to back it up, but the method of the present invention is not scheduled to run an automatic backup for another 60 minutes, he can back up the files manually. When the user runs a manual backup, the interval set for automatic backups is reset.

The user can also interrupt an automatic or manual backup if it occurs at an inappropriate time. For example, if the user is performing a resource-intensive task and an automatic backup starts, he can stop it. When the user stops an automatic backup, the interval that is set for automatic backups is reset.

Retrieving & Syncronising

If a watched file becomes corrupt, is missing, or is mistakenly deleted, the user can retrieve a recent copy of it from the online backup repository. For this reason, it is important to ensure to back up the files regularly. If the user delete a watched file from the computer intentionally, the user can also delete the backed up copy from the online backup repository. Removing non-essential files in this way helps to free storage space.

Because the method of the present invention allows the user to access and modify the backed up files from multiple computers, the user must ensure that the most up-to-date versions of the files are always stored in the online backup repository; otherwise, the files will be out of synchronization. For example, if the user updates a backed up file on a remote computer, the file automatically appears in the Modified Files list on any other computers also running the method of the present invention. This indicates that the version of the file in the online backup repository is newer than the version of the file on the other computers. To resolve this inconsistency and avoid overwriting the backed up file with an older version, the user must synchronize the file. Synchronizing updates the copy of the file on the user's computer with the version of the file in the online backup repository. If the user does not want to synchronize the file, he can delete it from the Modified Files list. The next time that the file is backed up, the version of the file that resides on the computer will replace the version in the online backup repository.

Other Features

After the user backs up some files, he can use the method of the present invention to work with them. Your backed up files are presented to the user in a traditional explorer view which allows the user to locate them easily. As your online backup repository grows, the user might want to sort the files or search for them. The user can also open files directly in the explorer view to examine the content without having to retrieve the files.

The user can use the method of the present invention to share files with others (using any valid e-mail address) or to publish the files to the Internet. Most importantly, the user can retrieve the files from the online backup repository if the local copies are out-of-date, or are missing, or become corrupt. The method of the present invention also provides the user with the information the user needs to manage the online backups and storage space.

For added convenience, the user can work with the online backup files from a remote computer or handheld device using the Web client. For example, if the user set ups the method of the present invention to back up files on his home computer, the user can then access, share, or publish those files on a remote computer or handheld device using a Web browser.

The online backup explorer allows the user to view and manipulate the files that the user has backed up online. The user can view each file's name, type, location, size, state (that is, backed up, not backed up, or backup in progress), and the date on which each file was last backed up. The user can also sort the files by any of these criteria.

If the user has a large repository of backed up files, the user can find a file quickly by searching for it. The user can search for all or part of a file's name or path, and can then narrow his search by specifying the approximate file size and the date on which it was last backed up.

When the user locates a file, he can open it directly in the online backup explorer. The method of the present invention opens the file in its native program, allowing the user to make changes without leaving the online backup explorer. The file is saved to the original watch location on the user's computer and is backed up automatically according to the backup schedule the user has defined.

Each file that is stored in the online backup repository has certain properties (attributes) associated with it. The user can modify certain file properties; for example, the user can assign a keyword to a file to establish a relationship or connection with other files that have the same keyword assigned to them. The user can then use these keywords to narrow a search for published files in the Online Backup library on the Internet.

The user can sort his backed up files and folders by the following criteria: name, file type, size, state (that is, backed up, not backed up, or backup in progress), the date on which the files were last backed up, or the location of the files on the computer (path).

The user assigns keywords to files to establish relationships between seemingly unrelated files and to make those files easier to find in the Online Backup library on the Internet. For example, if the user backs up a series of files that are all related to the same project, the user can assign the project name as a keyword to each file. Then, when the user publishes the files, the user can search for the keyword to locate all the project files at once.

Share

After the user backs up a file, the user can use the method of the present invention to share it with others. When the user shares a file, he can send the backed up copy of the file to the e-mail recipients specified. Recipients receive an e-mail message indicating that files have been shared with them. The e-mail also contains a link to the shared files. The user can share multiple files with multiple recipients and can specify an expiry date for the share. Updates made to shared files are automatically available to the share recipients. When the share expires, recipients can no longer access the shared files.

Publish

If a watched file becomes corrupt, is missing, or is mistakenly deleted, the user can retrieve a recent copy of it from the online backup repository. For this reason, it is important to ensure that the user back up your files regularly. For more information about backing up files, see Backing up files. If the user deletes a watched file from your computer intentionally, the user can also delete the backed up copy from the online backup repository. Removing non-essential files in this way helps to free storage space.

Because the method of the present invention allows the user to access and modify his backed up files from multiple computers, the user must ensure that the most up-to-date versions of the files are always stored in the online backup repository; otherwise, the files will be out of synchronization. For example, if the user updates a backed up file on a remote computer, the file automatically appears in the Modified Files list on any other computers also running the method of the present invention. This indicates that the version of the file in the online backup repository is newer than the version of the file on the other computers. To resolve this inconsistency and to avoid overwriting the backed up file with an older version, the user synchronize the file. Synchronizing updates the copy of the file on a computer with the version of the file in the online backup repository. If the user does not want to synchronize the file, the user can delete it from the Modified Files list. The next time that the file is backed up, the version of the file that resides on the computer will replace the version in the online backup repository.

Local Backup Process

Archive Description

The method of the present application automatically prepares a computer machine on which data is stored for archival. As it is common to have user data stored in more than one storage location (called folders), at the start of the method, watch locations must be defined. The watch locations are defined as the storage locations where the method will keep a watch for (a) creation of new file(s) and (b) modifications of exiting file(s). Windows Desktop and My Documents are the locations which are chosen as the watch locations by default by the method of the present application. However, the method of the present application can also be customized and other storage locations such as C: drive, D: drive, E: drive etc. can also be chosen as the watch locations.

In addition to defining the watch location, the user is also provided the option of defining watch file types. Watch file types are defined as the types of files whose creation or modification must be identified in the selected watch locations. By default, the method of the present application keeps a watch for creation and/or modification of all types of files. However, the method of the present application can also be customized to keep a watch for only specific files types such as .mp3, .mpeg, .jpg, .vdo, .doc, .xls, .pdf, etc.

The user can also categorize the storage locations thus chosen in two categories. The first category being a deep watch location and the second category being a shallow watch location. If a particular storage location (folder) is categorized as a deep watch location, the entire storage location including any sub-storage locations included within the storage location are watched. In other words, if a folder is categorized as a deep watch location, the entire folder and also any sub-folders contained inside the selected folders are watched. By way of example, the Windows Desktop and My Documents locations are set up as deep watch locations.

If a particular storage location is categorized as a shallow watch location, only that storage location is kept under watched and no watch is kept on any sub-storage locations included within the storage location. In other words, if a folder is categorized as a shallow watch location, only the specified folder is watched and no watch is kept over any sub-folders contained inside the selected folder.

The user can categorize one or more of the storage locations thus chosen into any one of the above mentioned two categories.

The user can then choose the archival media on which he wishes the archival to be taken. By way of example, the user can chose the archival media to be any one of the following: CD, DVD, USB drive, external hard drive, or network drive. The user can change the archival media at any time.

The method for archiving user's data automatically according to a predetermined schedule on to an archival media comprises the following steps:
(a) obtaining the details regarding at least one of the following (i) the watch location(s), (ii) watch file type(s) (iii) category of the storage location(s) and (iv) archival media;
(b) periodically keeping a watch on the watch location(s) for (a) creation of new file(s) and/or (b) modifications of exiting file(s);
(c) preparing a file list wherein the list comprises details of the files that (a) have not been archived and/or (b) created newly after a previous archival and/or (c) modified after a previous archival; and
(d) storing the files on the list on a local archival media at a predetermined scheduled time.

In an embodiment of the present invention, for security reasons or size issues, encryption or compression are enabled by default for the archived files. The content of encrypted files is transformed from text to code, obscuring the information to make it unreadable by people who do not know how to decrypt it. Compressed files are compressed into a form that minimizes the space required to store or transmit it.

In another embodiment of the present invention, two types of archives: full or quick are made available. In the full archive mode, a complete set of data based on the watch file types and locations that have been set up are archived. On the other hand, in the quick archive mode only those watched files that have changed since the last full or quick archive are archived. By way of example, archiving of all files can be scheduled in a full archival mode or archival of all files with .jpeg as extension can be scheduled in a full archival mode or all files available on a particular list can be archived in a full archival mode.

In yet another embodiment of the present invention, the method can be scheduled so as to obtain a full archive of all watch locations every month or every fortnight or every week or after any other predetermined interval of time period as desired by the user. When the full archive is being performed, all files (i.e. all watch file types) in the watch location(s) are archived. Similarly, the method can be scheduled so as to obtain a quick archive of all watch locations every one week or every four days or every two days or after any other predetermined interval of time period as desired by the user. The method of the present invention ensures to archive all files that are created or modified after the last full archive or quick archive during a current full archive or quick archive.

In addition to the facility of scheduling, the user can also archive the contents of one or more watch locations on demand at any time. For example, if the user modifies a file and wishes to archive it immediately, the user can archive the file manually on an archival media. When the files are being archived manually, the interval that is set for automatic archives can be reset.

The method of the present invention enables a user to interrupt an automatic or manual archive if it occurs at an inappropriate time. For example, if the user is performing a resource-intensive task and an automatic archive starts, the user can stop the archival process. When the user stops an automatic archival process, the interval that is set for automatic archives can be reset.

The method of the present application allows a user to automatically schedule archives to any plug n play device. Unlike the current available applications which blindly archive any files that the user chooses, the method of the present invention intelligently keeps a watch on the new files created or modified and tags them archive. Therefore, the method of the present invention not only helps the user to identify the files which have not been archived (i.e. must be archived) but also could stop the user from archiving a file which has already been archived and not modified subsequently.

In an embodiment of the present invention, the data can be archived on the archival media in:
(a) as it is;
(b) in an encrypted mode;
(c) in a compressed mode;
(d) in an encrypted and compressed mode.

In another embodiment of the present invention, the change in the state of the file is identified i.e. the change in the state of the file original to a modified and every time a sub sequent modification is carried out is identified and stored in a list.

In yet another embodiment of the present invention, details as to whether the file has been archived or nor and if a file has been archived, the date on which the data has been archived and the archival media on which the data has been archived and other related information are stored in the list, which can be displayed to the user.

In still another embodiment of the present invention, the process of archival is made on a single click.

In one more embodiment of the present invention, the process of archival is scheduled.

In one another embodiment of the present invention, warnings are provided to the user for the process of connecting the archival media to the user computer from where data needs to be archived prior to the scheduled time period.

Restore-Description

According to a first embodiment of the present invention, there is provided a method for retrieving and restoring data which is available on a local archival media but lost or not available at a computer terminal which is connectable to the local archival media, said method comprising:
(a) detecting deletion or corruption of data stored on the computer terminal;
(b) obtaining retrieval and restoration location from a parking list; wherein retrieval and restoration location comprises details of the local archival media, the complete path of directory or a file on the particular local archival media from where the data is going to be retrieved;
(c) prompting the user to connect the computer terminal to the local archival media comprising the data to be retrieved; and
(d) automatically retrieving and restoring the data that was deleted or corrupted on the computer terminal.

In an embodiment of the present invention, the method further comprises the step of receiving from a local archival media a list of the data stored thereupon on behalf of the computer terminal.

In another embodiment of the present invention, the step of detecting deletion or corruption of data stored on the computer terminal comprises:
(a) obtaining the details regarding at least one of the following (i) the watch location(s), (ii) watch data type(s) and (iii) category of the storage location(s);
(b) periodically keeping a watch on the watch location(s) for (a) deletion and/or corruption of data;
(c) preparing a deletion and/or corruption data list wherein the list comprises details of the data that have been detected as been deleted or corrupted on the computer terminal.

In still another embodiment, the present invention further comprises preparing a parking list based on the deletion and/or corruption data list.

In yet another embodiment of the present invention, if a watch file becomes corrupt or is missing or is mistakenly deleted, the user can restore a copy of it from the local archive media.

For this reason, it is important to ensure that the user archives the data regularly. The user can also restore older versions of files from a local archive. For example, if the user regularly archives a file, but want to revert to a previous version of a file, the user can do so by locating the file in the archive location. If the archive location is a local drive or network drive, the user can browse for the file. If the archive location is an external hard drive or USB drive, the user must connect the drive to the computer, and then browse for the file. If the archive location is a CD or DVD, the user must insert the CD or DVD in the computer, and then browse for the file.

Please note that the data from the media are automatically displayed in the deletion and/or corruption data list. This is based on two points . . . whether the latest version of the data on the computer is same as the media or the data has been deleted from the machine.

The user can also use Browse option to select a particular data from older archived versions incase the user needs multiple version of the same file.

The user can also restore files that have been archived on one computer from a different computer. For example, if the user archives a set of files to an external hard drive on computer A, he can restore those files on computer B. To do so, he must install Data Backup on computer B and connect the external hard drive. Then, in Data Backup, the user can browse for the files and they are added to the parking list for restoration.

If a watch file becomes corrupt, is missing, or is mistakenly deleted, the user can restore a copy of it from a local archive. For this reason, it is important to ensure that the user archive your files regularly. The user can also restore older versions of files from a local archive. For example, if the user regularly archive a file, but want to revert to a previous version of a file, the user can do so by locating the file in the archive location. If the archive location is a local drive or network drive, the user can browse for the file. If the archive location is an external hard drive or USB drive, the user must connect the drive to the computer, and then browse for the file. If the archive location is a CD or DVD, the user must insert the CD or DVD in the computer, and then browse for the file.

Please note, the files from the media are automatically displayed in the Missing files. This is based on two points . . . whether the latest version of the files on the computer is same as the media or the file has been deleted from the machine.

Also, the user can use Browse to select files from older archived versions incase the user need multiple version of the same file.

The user can also restore files that the user has archived on one computer from a different computer. For example, if the user archives a set of files to an external hard drive on computer A, the user can restore those files on computer B. To do so, the user must install Data Backup on computer B and connect the external hard drive. Then, in Data Backup, the user browses for the files and they are added to the Missing Files list for restoration.

Synchronization

Missing Files: The files which are not present on the machine but are backed up on the server are called missing files.

Modified Files: The files which are backed up from one computer and are backed up again from some other computer with some changes are said to be modified. This means that the version of the document on the computer mismatches with the version on the server.

Parking Lot: The area in the client application which contains the list of missing files is called Parking Lot.

Synchronization: It is a process of reconciling two different copies of the same document on different machines using backed up server copy. Two or more machines are said to be synchronized when all such documents are synchronized between them.

Version: A modified copy of the same document is termed as a different version of the document. In this document different versions are referred as v1.0, v2.0 etc. v1.0 is the first version of a document v2.0 is a next version of the same.

Refresh Parking Lot: The process of getting the list of files backed up on the server and preparing parking lot to display missing or modified files.

Local Hard Disk: Local storage of a computer.

PC1, PC2: Denotation for a PC (Computer). They are numbered to differentiate them in the process.

| Synchronization and Retrieval Cases | | |
|---|---|---|
| Case No. | Steps | Expected Result |
| 1 | 1. Backup single file from PC1.<br>2. Delete the file from Local Hard Disk<br>3. Retrieve the file<br>4. Refresh the parking image on PC1 | The file should not come in Missing List or Modified file list. |
| 2 | 1. Backup single file from PC1 | The file should not |

TABLE-continued

Synchronization and Retrieval Cases

| Case No. | Steps | Expected Result |
|---|---|---|
|  | 2. Delete the file from Local Hard Disk<br>3. Retrieve the file<br>4. Remove the watch location<br>5. Refresh the parking image on PC1 | come in Missing List or Modified file list |
| 3 | 1. Backup single file from PC1<br>2. Delete the file from Local Hard Disk<br>3. Retrieve the file<br>4. Modified the file on PC1<br>5. Refresh the parking image on PC1 | The file should not come in Missing List or Modified file list |
| 4 | 1. Backup single file from PC1<br>2. Delete the file from Local Hard Disk<br>3. Retrieve the file.<br>4. Modified the file on PC1<br>5. Remove the watch from the location on PC1<br>6. Refresh the parking image on PC1 | The file should not come in Missing List or Modified file list |
| 5 | 1. Backup single file from PC1<br>2. Delete the file from Local Hard Disk<br>3. Retrieve the file<br>4. Modified the file on PC1<br>5. Remove the watch from the location on PC1<br>6. Retrieve file on PC2<br>7. Modify the file on PC2 & backup the file again.<br>Refresh the server image on PC1 | The file should come in missing file list. |
| 6 | 1. Backup single file from PC1<br>2. Delete the file from Local Hard Disk<br>3. Retrieve the file<br>4. Delete the file on PC1<br>5. Refresh the server image | The file should come in missing file list. |
| 7 | 1. Backup single file from PC1<br>2. Delete the file from Local Hard Disk<br>3. Retrieve the file<br>4. Delete the file on PC1<br>5. Retrieve the file on PC2<br>6. Modify the file on PC2<br>7. Backup the file again from PC2<br>8. Refresh server image on PC2 | The file should come in missing file list. |
| 8 | 1. Backup single file from PC1<br>2. Remove the watch location<br>3. Exit the application<br>4. Re-launch the application | The file should not come in MISSING File list |
| 9 | 1. Backup single file from PC1<br>2. Remove the watch location<br>3. Exit the application<br>4. Re-launch the application<br>5. Modify the files<br>6. Add the watch location<br>7. Refresh the Parking Image on PC1 | The file should not come in MISSING file list |
| 10 | 1. Backup single file from PC1<br>2. Remove the watch location<br>3. Exit the application<br>4. Rename some files.<br>5. Re-launch the application<br>6. Refresh the Parking Image on PC1 | The file should not come in MISSING file list |
| 11 | 1. Backup single file from PC1<br>2. Remove the watch location<br>3. Exit the application<br>4. Rename some files<br>5. Re-launch the application<br>6. Add the watch location again<br>7. Refresh the Parking Image on PC1 | The file should not come in MISSING File list |
| 12 | 1. Backup single file from PC1 | The file should not |

TABLE-continued

Synchronization and Retrieval Cases

| Case No. | Steps | Expected Result |
|---|---|---|
|  | 2. Remove the watch location<br>3. Exit the application<br>4. Re-launch the application<br>5. Modify the files<br>6. Refresh the Parking Image on PC1 | come in MISSING File list |
| 13 | 1. Upload the file from web client<br>2. Refresh the parking image on PC1<br>3. File comes in missing file list.<br>4. Download the file from PC1 | The file should not come in missing list |
| 14 | 1. Upload the file from PC1<br>2. Modify and again upload the file from PC1<br>3. Delete the file from PC1<br>4. Refresh the parking image on PC1<br>5. File should come in missing list<br>6. Download the file from PC2<br>7. Modify the file<br>8. Upload the file from PC2<br>9. Refresh the parking image on PC2 | The file should not come in missing list on PC2 |
| 16 | 1. Upload a file from PC1<br>2. Modify and again upload the from PC1<br>3. Delete the file from PC1<br>4. Refresh the parking image on PC1, file should come in missing list<br>5. Download the file from PC2<br>6. Modify and upload the file from PC2<br>7. Refresh the parking image on PC1 | The file should not come in missing list on PC1 |
| 17 | 1. Upload a file from PC1<br>2. Modify and upload the file from PC1<br>3. Delete the file from PC1<br>4. Refresh the parking image on PC1, file should come in missing list<br>5. Download the file from PC2<br>6. Modify and upload the file from PC2<br>7. Refresh the parking image on PC1 | The file should not come in missing list on PC2 |
| 18 | 1. Upload a file from PC1<br>2. Modify and upload the file from PC1<br>3. Delete the file from PC1<br>4. Refresh the parking image on PC1, file should come in missing list<br>5. Download the file from PC1<br>6. Download the file from PC2<br>7. Modify and upload the file from PC2<br>8. Retrieve the file on PC1<br>9. Delete the file from PC1<br>10. Refresh the parking on PC1 | The file should come in missing list |
| 19 | 1. Upload a file from PC1<br>2. Delete the file from PC1, file should come in missing list<br>3. Download the file from PC1<br>4. Download the file from PC2<br>5. Modify and upload the file from PC2<br>6. Refresh the parking image on PC2, No file should come in missing list.<br>7. Remove watch location in PC1<br>8. Refresh the image on PC1; file should come in missing list.<br>9. Download the file on PC1<br>10. Refresh the parking image on | The file should not come in missing list |

Synchronization and Retrieval Cases

| Case No. | Steps | Expected Result |
|---|---|---|
| 20 | 1. Upload the file on PC1<br>2. Delete the file from PC1 & retrieve this file<br>3. Refresh the parking lot on PC1<br>4. Retrieve file on PC2<br>5. Change the file & upload the file again back to server<br>6. Modify the file on client machine<br>7. Remove the watch from the file<br>8. Refresh the parking lot on PC1 | The file should come in missing list. |
| 21 | 1. Upload the file on PC1<br>2. Delete the file from PC1 & retrieve this file<br>3. Refresh the parking lot on PC1<br>4. Retrieve file on PC2<br>5. Change the file & upload the file again back to server<br>6. Modify the file on client machine<br>7. Refresh the parking lot on PC1 | The file will not come in MISSING file list. The file will come in MODIFIED file list. |
| 22 | 1. Upload the file on PC1<br>2. Delete the file from PC1 & retrieve this file<br>3. Refresh the parking lot on PC1<br>4. Retrieve file on PC2<br>5. Change the file & upload the file again back to server<br>6. Modify the file on client machine<br>7. Refresh the parking lot on PC1<br>8. File will come in missing file list of PC1<br>9. Retrieve the file on PC1<br>10. Upload the file again from PC1 after doing some modification<br>11. Refresh parking lot on PC1 | The file will not come in MISSING file list. The file will also not come in modified file list. |
| 23 | 1. Upload a file from PC1<br>2. Modify and upload the file from PC1<br>3. Delete the file from PC1<br>4. Refresh the parking image on PC1, file should come in missing list<br>5. Download the file from PC1<br>6. Download the file from PC2<br>7. Modify and upload the file from PC2<br>8. Refresh the parking lot on PC1 | No file should come in the MISSING List and one file should come in the MODIFIED List. |
| 24 | 1. Upload a file from PC1<br>2. Modify and upload the file from PC1<br>3. Delete the file from PC1<br>4. Refresh the parking image on PC1, file should come in missing list<br>5. Download the file from PC1<br>6. Download the file from PC2<br>7. Modify and upload the file from PC2<br>8. Refresh the parking lot on PC1<br>9. Synchronize the file on PC1 & do some modification<br>10. Upload the file back from PC1<br>11. Refresh parking lot on PC2 | The file should come in MODIFIED file list on PC2. |
| 25 | 1. Upload a file from PC1<br>2. Modify and upload the file from PC1<br>3. Delete the file from PC1<br>4. Refresh the parking image on PC1, file should come in missing list<br>5. Download the file from PC1<br>6. Download the file from PC2<br>7. Modify and upload the file from PC2<br>8. Refresh the parking lot on PC19<br>9. Again do some modification on PC2<br>10. Upload the file<br>11. Retrieve the Modified file on PC1 | The latest file that is backed up from PC2 should get retrieved to PC1. |

It will be appreciated that method steps of the invention described herein may be implemented using one or more conventional processors and unique stored program instructions that control the one or more processors to implement, in conjunction with certain non-processor circuits, some, most, or all of the functions described herein. Alternatively, some or all method steps could be implemented by a state machine that has no stored program instructions or in one or more application specific integrated circuits (ASICs), in which each method or some combinations of certain of the method steps are implemented as custom logic. Of course, a combination of the two approaches could be used. Thus, method and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As described above, the subject matter of the present application is relevant to subject matter disclosed in co-pending Patent Application No. 2783/DEL/2005 filed 18 Oct. 2005, co-pending Patent Application No. 3030/DEL/2005 filed September 11 Nov. 2005, co-pending Patent Application No. 3049/DEL/2005 filed 15 Nov. 2005, co-pending Patent Application No. 1316/DEL/2006 filed 31 May 2006, co-pending Patent Application No. 1317/DEL/2006 filed 31 May 2006 and co-pending Patent Application No. 1318/DEL/2006 filed 31 May 2006, all of which are filed by the same inventors. Any of the embodiments described in the above-listed documents can be used in combination with any of the embodiments described in the present application. The foregoing detailed description has described only a few of the many possible implementations of the present invention. Thus, the detailed description is given only by way of illustration and nothing contained in this section should be construed to limit the scope of the invention. The claims are limited only by the following claims, including the equivalents thereof.

We claim:

1. A hybrid data backup method for storing user's data automatically according to a predetermined schedule, said method comprising:
   obtaining details regarding file locations and file types;
   periodically checking the file locations for creation of new files and modifications of existing files;
   preparing a file list wherein the list comprises details of files that have not been backed up and/or created newly after a previous backup and/or modified after a previous backup;
   obtaining details regarding a nature of backup to be performed in respect of each of the files contained in the file list;

enabling both online and offline backups of each of the files contained in the file list from one application using a single toggle operation;

storing the files on the list at a location which is determined on the basis of the nature of backup method to be performed at a predetermined scheduled time; and configuring a given file location as a deep watch location and backing up all file types in folders in the deep watch location, including any sub-storage locations included within the deep watch location.

2. The method as claimed in claim 1, wherein the nature of backup to be performed is an on-line backup method and an off-line backup method.

3. The method as claimed in claim 2, wherein the location corresponding to the on-line backup method is a backup server.

4. The method as claimed in claim 2, wherein the location corresponding to the off-line backup method is an archival media selected from the group comprising a CD, a DVD, a USB drive, an external hard drive, or a network drive.

5. The method as claimed in claim 1, wherein the after storing the file, the location where the file is stored is stored in a list.

6. An apparatus, including hardware and/or software for storing user's data automatically according to a predetermined schedule comprising:

a processor;

a memory coupled to the processor, wherein the memory includes executable instructions that are executed by the processor:

obtain details regarding file locations and file types;

periodically check the file locations for creation of new files and modifications of exiting files;

prepare a file list wherein the list comprises details of files that have not been backed up and/or created newly after a previous backup and/or modified after a previous backup;

obtain details regarding a nature of backup to be performed in respect of each of the files contained in the file list;

enable both online and offline backups of each of the files contained in the file list from one application using a single toggle operation;

store the files on the list at a location which is determined based on the nature of backup method, including online and offline, and on a predetermined scheduled time; and configure a given file location as a deep watch location and backup all file types in folders in the deep watch location, including any sub-storage locations included within the deep watch location.

7. A non-transitory computer readable medium including computer readable instructions stored thereon that, when executed by a processor, cause a computing machine to:

obtain details regarding file locations and file types;

periodically check the file locations for creation of new files and modifications of exiting files;

prepare a file list wherein the list comprises details of files that have not been backed up and/or created newly after a previous backup and/or modified after a previous backup;

obtain details regarding a nature of backup to be performed in respect of each of the files contained in the file list;

enable both online and offline backups of each of the files contained in the file list from one application using a single toggle operation;

store the files on the list at a location which is determined based on the nature of backup method, including online and offline, and on a predetermined scheduled time; and configure a given file location as a deep watch location and backup all file types in folders in the deep watch location, including any sub-storage locations included within the deep watch location.

8. The medium of claim 7, further including instructions that are executed by the processor to configure a given file location as a shallow watch location, and wherein the instructions are executed to backup file types in folders in the shallow watch location but not within any sub-folders within the shallow watch location.

* * * * *

UNITED STATES PATENT AND TRADEMARK OFFICE
CERTIFICATE OF CORRECTION

PATENT NO.         : 8,078,580 B2                                        Page 1 of 1
APPLICATION NO.    : 12/294939
DATED              : December 13, 2011
INVENTOR(S)        : Pankaj Anand et al.

It is certified that error appears in the above-identified patent and that said Letters Patent is hereby corrected as shown below:

In column 15, line 22, in Claim 5, after "the file" delete "is stored".

Signed and Sealed this
Fourth Day of December, 2012

David J. Kappos
*Director of the United States Patent and Trademark Office*